United States Patent
Du et al.

(10) Patent No.: US 12,474,171 B2
(45) Date of Patent: Nov. 18, 2025

(54) PATH PLANNING FOR MOBILE MACHINE IN LARGE SCALE NAVIGATION

(71) Applicants: Futronics (NA) Corporation, Pasadena, CA (US); UBTECH ROBOTICS CORP LTD, Shenzhen (CN)

(72) Inventors: Huaguang Du, Pasadena, CA (US); Zhipeng Liu, Pasadena, CA (US); Fangyun Zhao, Pasadena, CA (US); Chengkun Zhang, Pasadena, CA (US); Huan Tan, Pasadena, CA (US)

(73) Assignees: FUTRONICS (NA) CORPORATION, Pasadena, CA (US); UBTECH ROBOTICS CORP LTD, Shenzhen (CN)

( * ) Notice: Subject to any disclaimer, the term of this patent is extended or adjusted under 35 U.S.C. 154(b) by 101 days.

(21) Appl. No.: 18/407,494

(22) Filed: Jan. 9, 2024

(65) Prior Publication Data
US 2025/0224235 A1    Jul. 10, 2025

(51) Int. Cl.
*G01C 21/20* (2006.01)
*G01C 21/00* (2006.01)

(52) U.S. Cl.
CPC ........... *G01C 21/206* (2013.01); *G01C 21/38* (2020.08)

(58) Field of Classification Search
CPC .............................. G01C 21/206; G01C 21/38
See application file for complete search history.

(56) References Cited

U.S. PATENT DOCUMENTS

| | | | | |
|---|---|---|---|---|
| 9,939,814 | B1* | 4/2018 | Bauer | G05D 1/0274 |
| 2006/0080029 | A1* | 4/2006 | Kodani | G08G 1/09685 |
| | | | | 701/420 |
| 2012/0209512 | A1* | 8/2012 | Kujirai | G01C 21/3423 |
| | | | | 701/428 |
| 2014/0141803 | A1* | 5/2014 | Marti | G01C 21/206 |
| | | | | 455/456.2 |
| 2016/0252355 | A1* | 9/2016 | Mays | G01C 21/206 |
| | | | | 701/533 |
| 2023/0117379 | A1* | 4/2023 | Imazu | G05D 1/0011 |
| | | | | 701/2 |

OTHER PUBLICATIONS

"Applications of machine vision in agricultural robot navigation: A review", Tianhai Wang et al., "Computers and Electronics in Agriculture", 198 (2022) 107085, pp. 1-13.
(Continued)

*Primary Examiner* — Aaron L Troost

(57) ABSTRACT

Path planning for mobile machine in large scale navigation disclosed. A path for moving a mobile machine is planned by: determining a start map node in a map graph based on a start point in the path and a goal map node in the map graph based on a goal point in the path; determining whether the start map node and the goal map node correspond to the same submap; and if so, planning the path between the start point and the goal point using a real-time path planning method; otherwise, obtaining the path between the start point and the goal point by merging a node path between the start map node and the goal map node, a first real-time path between the start point and a first stop point, and a second real-time path between the goal point and a last stop point.

20 Claims, 15 Drawing Sheets

(56) References Cited

OTHER PUBLICATIONS

"Robot navigation in large-scale social maps: An action recognition approach", Konstantinos Charalampous et al., "Expert Systems With Applications", 66 (2016), pp. 261-273.
"A Navigation System for Robots Operating in Crowded Urban Environments", Rainer Kommerle et al., "IEEE International Conference on Robotics and Automation (ICRA)", 2013, pp. 3225-3232.
"SLAM, Path Planning Algorithm and Application Research of an Indoor Substation Wheeled Robot Navigation System", Jianxin Ren et al., "Electronics", 2022, 11, 1838, pp. 1-21.
"Remote Big Data Management Tools, Sensing and Computing Technologies, and Visual Perception and Environment Mapping Algorithms in the Internet of Robotic Things", Mihai Andronie et al., "Electronics", 2023, 12, 22, pp. 1-32.
"LAMP: Large-Scale Autonomous Mapping and Positioning for Exploration of Perceptually-Degraded Subterranean Environments", Kamak Ebadi et al., "IEEE International Conference on Robotics and Automation (ICRA)", 2020, pp. 80-86.
"Elevation Mapping for Locomotion and Navigation using GPU", Takahiro Miki et al., "IEEE/RSJ International Conference on Intelligent Robots and Systems (IROS)", 2022, pp. 2273-2280.
"OpenStreetMap-Based Autonomous Navigation for the Four Wheel-Legged Robot Via 3D-Lidar and CCD Camera", Jing Li et al., "IEEE Transactions on Industrial Electronics", vol. 69, No. 3, 2022, pp. 2708-2717.

* cited by examiner

PATH PLANNING FOR MOBILE MACHINE IN LARGE SCALE NAVIGATION

BACKGROUND

1. Technical Field

The present disclosure relates to path planning, and particularly to path planning for mobile machine in large scale navigation.

2. Description of Related Art

Advancements in sensing, robotic technologies and artificial intelligence (AI) algorithms have allowed mobile robots to navigate autonomously in given scenarios. Path planning is a critical component in autonomous navigation. However, very limited research has looked navigation at large-scale indoor areas due to technical challenges and human-centered concerns, while research and development have been mostly focused on path-planning in outdoor scenarios like crowded urban environments, extreme terrains, or in agricultural settings. Moreover, medical (healthcare) facilities (e.g., hospitals, clinics, and nursing homes) present additional challenges because of the uncertainty of human traffic flow, changeable floorplan, and specific medical protocols for emergency situations.

Many recent research in mapping and navigation has been focused on using computer vision and deep learning algorithms to allow sensor fusion and accurately detect objects both in-door and outdoor, which often requires large computational powers and specific support of GPUs (graphics processing units) while most commercially available mobile robots do not have the capability to carry state-of-the-art algorithms due to limitations on the hardware specifications and cost.

Specifically, there are two major challenges. First, most existing autonomous navigation methods focused on outdoor environments. These methods can benefit applications like autonomous driving, space explorations and urban delivery. However, it may not be applicable for indoor areas with crowded human traffic. Second, most research implement deep learning methods to achieve accurate object detections and advanced path planning, while these implementations requires either advanced computational powers and support of GPUs, or fast communications between robots and server over internet. However, most commercially available mobile robots do not equip with the kind of hardware to support real-time network communication or large computational power.

Consequently, to address the forgoing issues, it is necessary to develop new methods specific to large indoor facility scenarios that perform path planning and navigation on mobile machines such as mobile robots.

BRIEF DESCRIPTION OF THE DRAWINGS

In order to more clearly illustrate the technical solutions in this embodiment, the drawings used in the embodiments or the description of the prior art will be briefly introduced below. In the drawing(s), like reference numerals designate corresponding parts throughout the figures. It should be understood that, the drawings in the following description are only examples of the present disclosure. For those skilled in the art, other drawings can be obtained based on these drawings without creative works.

DETAILED DESCRIPTION

Figure 1:
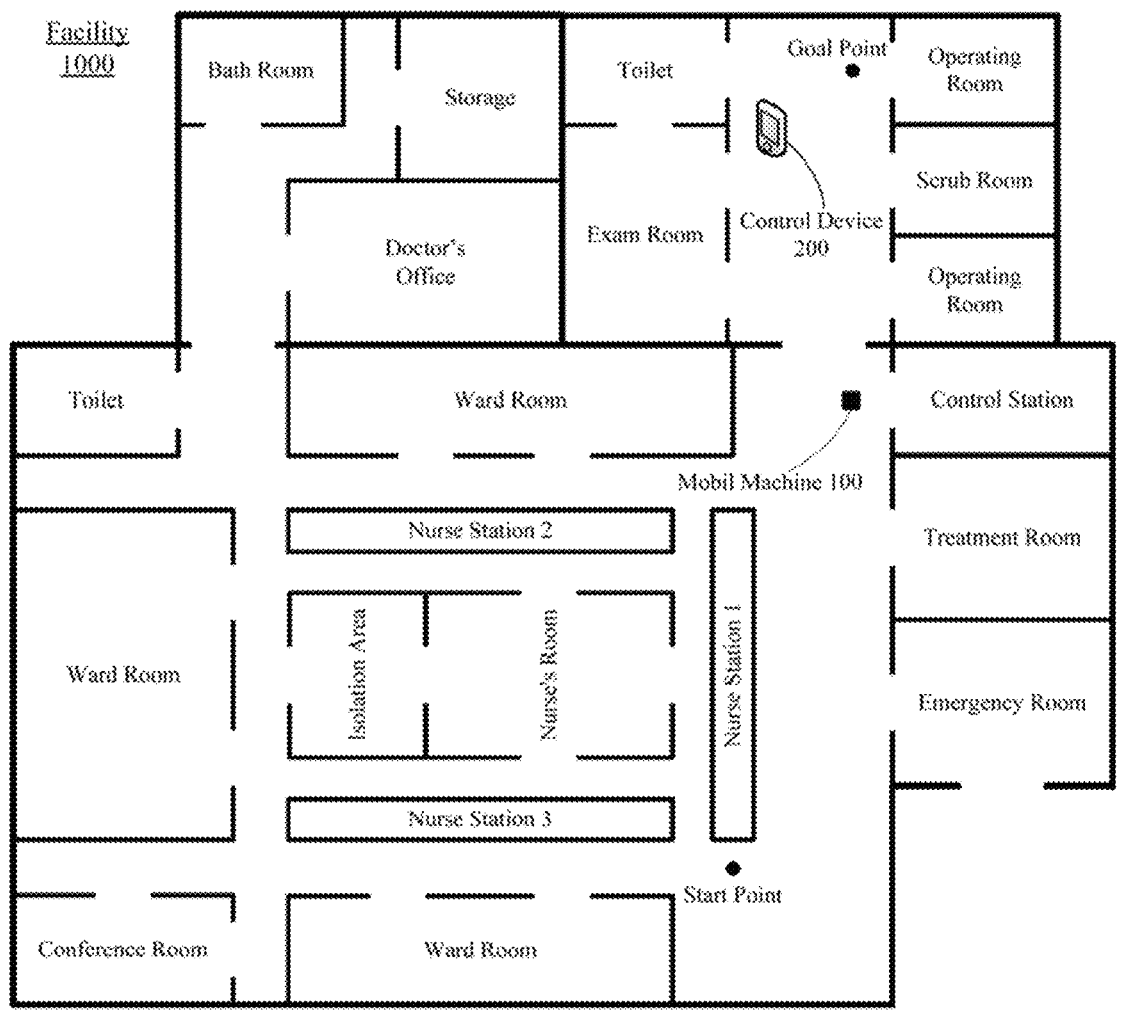
FIG. 1 is a schematic diagram of a scenario of navigating a mobile machine in a facility according to some embodiments of the present disclosure.

In order to make the objects, features and advantages of the present disclosure more obvious and easy to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including", "comprising", "having" and their variations indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

In the present disclosure, the terms "first", "second", and "third" are for descriptive purposes only, and are not to be comprehended as indicating or implying the relative importance or implicitly indicating the amount of technical features indicated. Thus, the feature limited by "first", "second", and "third" may include at least one of the feature either explicitly or implicitly. In the description of the present disclosure, the meaning of "a plurality" is at least two, for example, two, three, and the like, unless specifically defined otherwise.

In the present disclosure, the descriptions of "one embodiment", "some embodiments" or the like described in the specification mean that one or more embodiments of the present disclosure can include particular features, structures, or characteristics which are related to the descriptions of the descripted embodiments. Therefore, the sentences "in one embodiment", "in some embodiments", "in other embodiments", "in other embodiments" and the like that appear in different places of the specification do not mean that descripted embodiments should be referred by all other embodiments, but instead be referred by "one or more but not all other embodiments" unless otherwise specifically emphasized.

The present disclosure relates to path planning and navigation for a mobile machine. As used herein, the term "mobile machine" refers to a machine such as a mobile robot or a vehicle that has the capability to move around in its environment. The term "path planning" refers to find a sequence of valid configurations that moves a mobile machine from the source to the goal point, where "path" denotes a set of states (position and/or orientation) or waypoints without time stamp (cf. "trajectory" denotes a set of states or waypoints with time stamp). The term "navigation" refers to the process of monitoring and controlling the movement of a mobile machine from one place to another, and the term "collision avoidance" refers to prevent or reduce the severity of a collision. The term "sensor" refers to a device, module, machine, or subsystem such as ambient light sensor and image sensor (e.g., camera) whose purpose is to detect events or changes in its environment and send the information to other electronics (e.g., processor).

FIG. 1 is a schematic diagram of a scenario of navigating a mobile machine 100 in a facility 1000 according to some embodiments of the present disclosure. In some embodiments, the facility 1000 may be a health care institution such as a hospital, a convalescent hospital, a health maintenance organization, a health clinic, a nursing home, an extended care facility. In other embodiments, the facility 1000 may be other large indoor facility such as shopping mall, airport, railway/bus station, or factory. It should be noted that the facility 1000 is only an example of large indoor facility that is simplified for the convenience of explaining large-scale navigation scenario (in the non-large-scale navigation scenarios, real-time path planning/navigation methods will be employed). The mobile machine 100 (e.g., a nursing robot) is navigated in the facility 1000 so as to, for example, perform a nursing task such as physical assessment, wound care, mobility assistance, and emergency response, while dangerous situations such as collisions and unsafe conditions (e.g., falling, extreme temperature, radiation, and exposure) are prevented. In this indoor navigation, the mobile machine 100 is navigated from a start point (e.g., the position where the mobile machine 100 originally locates) to a goal point (e.g., the position of the goal of navigation which is indicated by the user or the navigation/operation system of the mobile machine 100) along a planned path, while an obstacle O) (e.g., human, furniture, and garbage) (see FIG. 9) is avoided so as to prevent the above-mentioned dangerous situations.

Figure 12:
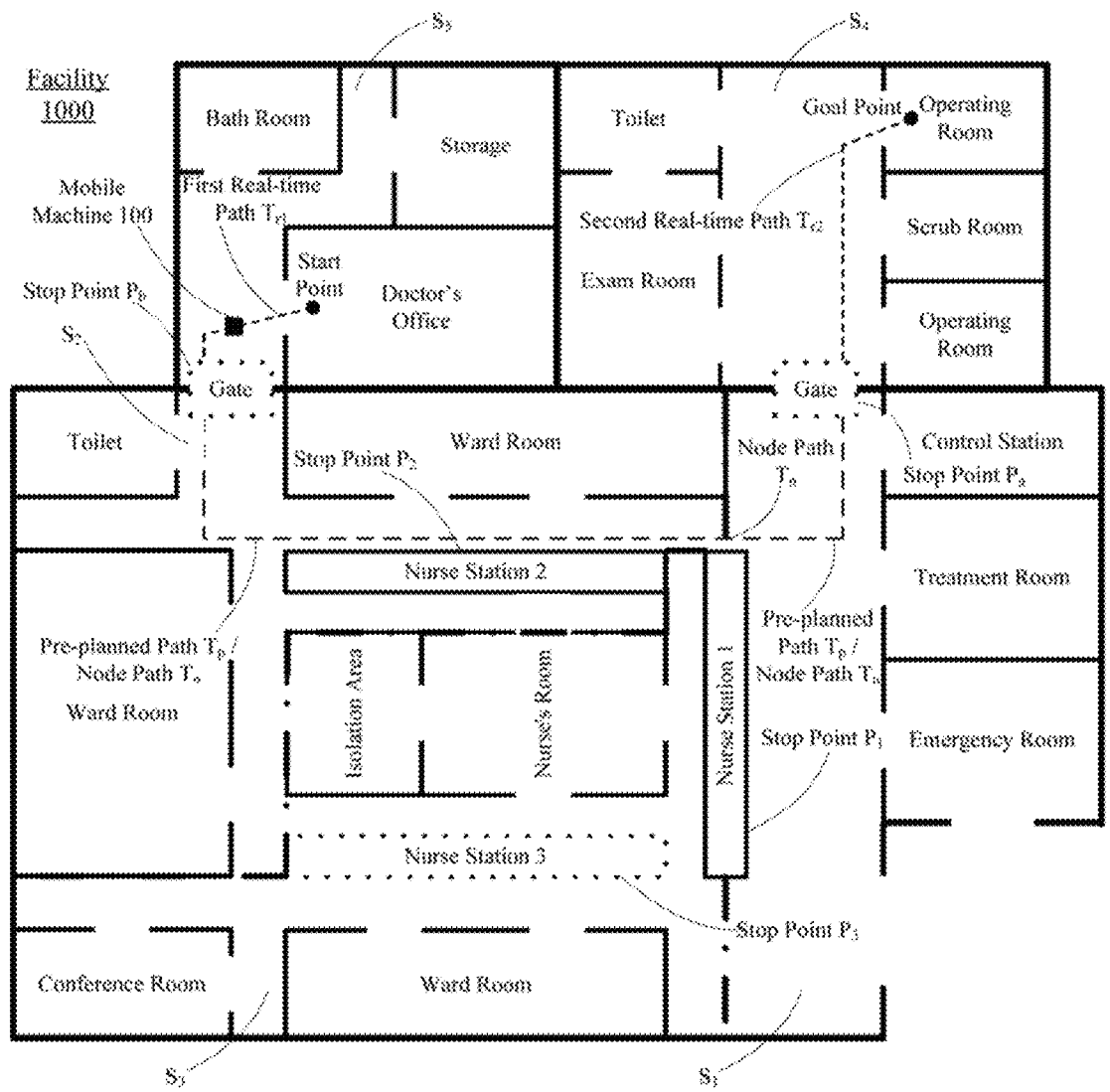
FIG. 12 is a schematic diagram of an example of navigating the mobile machine of FIG. 2 across at least three submaps.

The path(s) (e.g., first real-time path $T_{r1}$, second real-time path $T_{r2}$, and node path $T_n$ in FIG. 12) for the mobile machine 100 to move from the start point to the goal point has to be planned so as to move the mobile machine 100 according to the path(s), thereby realizing the navigation of the mobile machine 100. In some embodiments, for realizing the path planning (and the navigation) of the mobile machine 100, the map for the environment has to be built, and the position of the mobile machine 100 in the environment may have to be determined. For example, a node path between map nodes in a map graph (e.g., map graph $G_2$ in FIG. 6) may be planned based on the built map, and a real-time path may be planned based on the built map and the determined real-time position of the mobile machine 100.

In some embodiments, the path planning (and navigation) of the mobile machine 100 may be actuated through the mobile machine 100 itself (e.g., a control interface on the mobile machine 100) or a control device 200 such as a remote control, a smart phone, a tablet computer, a notebook computer, a desktop computer, or other electronic device by, for example, providing a request for the navigation and/or the path planning of the mobile machine 100. The mobile machine 100 and the control device 200 may communicate over a network which may include, for example, the Internet, intranet, extranet, local area network (LAN), wide area network (WAN), wired network, wireless networks (e.g., Wi-Fi network, Bluetooth network, and mobile network), or other suitable networks, or any combination of two or more such networks.

Figure 2:
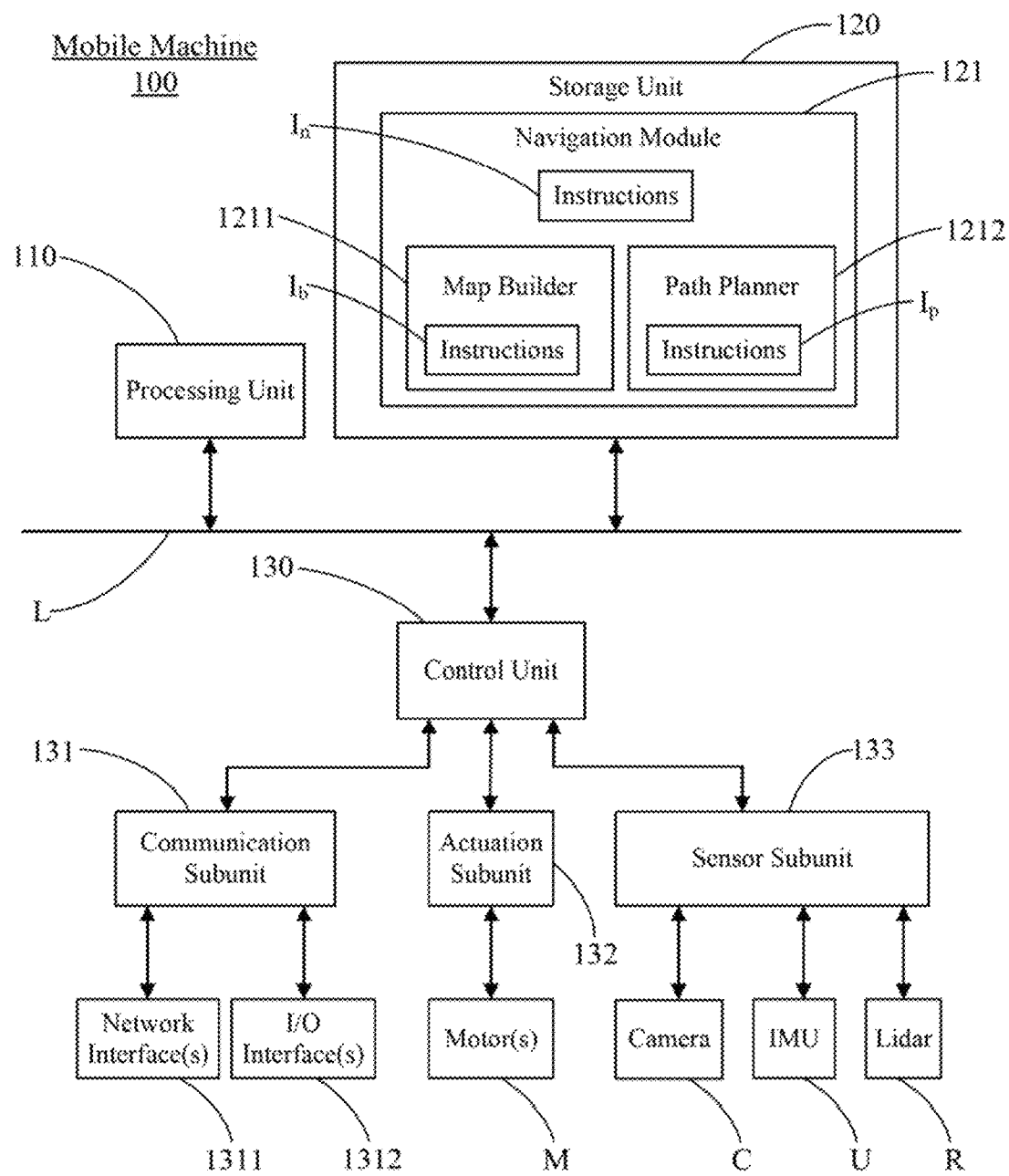
FIG. 2 is a schematic block diagram illustrating a mobile machine according to some embodiments of the present disclosure.

FIG. 2 is a schematic block diagram illustrating the mobile machine 100 according to some embodiments of the present disclosure. The mobile machine 100 may be a mobile robot such as a wheeled robot, which may include a processing unit 110, a storage unit 120, and a control unit 130 that communicate over one or more communication buses or signal lines L. It should be noted that, the mobile machine 100 is only one example of mobile machine, and the mobile machine 100 may have more or fewer components (e.g., unit, subunits, and modules) than shown in above or below, may combine two or more components, or may have a different configuration or arrangement of the components. The processing unit 110 executes various (sets of) instructions stored in the storage unit 120 that may be in form of software programs to perform various functions for the mobile machine 100 and to process related data, which may include one or more processors (e.g., CPU). The storage unit 120 may include one or more memories (e.g., high-speed random access memory (RAM) and non-transitory memory), one or more memory controllers, and one or more non-transitory computer readable storage mediums (e.g., solid-state drive (SSD) or hard disk drive). The control unit 130 may include various controllers (e.g., camera controller, display controller, and physical button controller) and peripherals interface for coupling the input and output peripheral of the mobile machine 100, for example, external port (e.g., USB), wireless communication circuit (e.g., RF communication circuit), audio circuit (e.g., speaker circuit), sensor (e.g., inertial measurement unit (IMU)), and the like, to the processing unit 110 and the storage unit 120. In some embodiments, the storage unit 120 may include a navigation module 121 for implementing navigation functions (e.g., map building and path planning) related to the navigation (and path planning) of the mobile machine 100, which may be stored in the one or more memories (and the one or more non-transitory computer readable storage mediums). In other embodiments, the mobile machine 100 may be a vehicle such as a car, a drone, or a vessel.

The navigation module 121 in the storage unit 120 of the mobile machine 100 may be a software module (of the operation system of the mobile machine 100), which has instructions $I_n$ (e.g., instruction for actuating motor(s) M of the mobile machine 100 to move the mobile machine 100) for implementing the navigation of the mobile machine 100, a map builder 1211, and path planner(s) 1212. The map builder 1211 may be a software module having instructions $I_b$ for building map for the mobile machine 100. The path planner(s) 1212 may be software module(s) having instructions $I_p$ for planning path for the mobile machine 100. The path planner(s) 1212 may include a global path planner for planning global paths (e.g., the above-mentioned node path $T_n$) for the mobile machine 100 and a local path planner for planning local paths (e.g., first real-time path $T_{r1}$ and second real-time path $T_{r2}$ in FIG. 10 and FIG. 12) for the mobile machine 100. The global path planner may be, for example, a path planner which plans global paths based on map(s) built by the map builder 1211 through, for example, simultaneous localization and mapping (SLAM). The local path planner may be, for example, a path planner based on A*, RRT* (rapidly-exploring random trees), or TEB (timed elastic band) algorithm, which plans local paths based on the global paths, and other data collected by the mobile machine 100. For example, images may be collected through a camera C and/or a Lidar R of the mobile machine 100, and the collected images may be analyzed so as to identify obstacles, so that the local path can be planned with reference to the identified obstacles, and the obstacles can be avoided by moving the mobile machine 100 according to the planned local path. In other embodiments, rather than including the global path planner and the local path planner, the path planner(s) 1212 may include a path planner for planning both the global paths and the local paths.

Each of the map builder 1211 and the path planner(s) 1212 may be a submodule separated from the instructions $I_n$ or other submodules of the navigation module 121, or a part of the instructions $I_n$ for implementing the navigation of the mobile machine 100. The path planner(s) 1212 may further have data (e.g., input/output data and temporary data) related to the path planning of the mobile machine 100 which may be stored in the one or more memories and accessed by the processing unit 110. In some embodiments, each of the path planner(s) 1212 may be a module in the storage unit 120 that is separated from the navigation module 121.

In some embodiments, the instructions $I_n$ may include instructions for implementing collision avoidance of the mobile machine 100 (e.g., obstacle detection and path replanning). In addition, the local path planner may plan a detour path to graft to the global path(s) in response to, for example, the original global path(s) being blocked (e.g., blocked by an unexpected obstacle) or inadequate for collision avoidance (e.g., impossible to avoid a detected obstacle when adopted) (the detour path is grafted to the global path(s) by replacing a part of the original global path(s) that is near to the obstacle). In other embodiments, the navigation module 121 may be a navigation unit communicating with the processing unit 110, the storage unit 120, and the control unit 130 over the one or more communication buses or signal lines L, and may further include one or more memories (e.g., high-speed random access memory (RAM) and non-transitory memory) for storing the instructions $I_n$, the map builder 1211, and the path planner(s) 1212, and one or more processors (e.g., MPU and MCU) for executing the stored instructions $I_n$, $I_b$ and $I_p$ to implement the navigation of the mobile machine 100.

The mobile machine 100 may further include a communication subunit 131 and an actuation subunit 132. The communication subunit 131 and the actuation subunit 132 communicate with the control unit 130 over one or more communication buses or signal lines that may be the same or at least partially different from the above-mentioned one or more communication buses or signal lines L. The communication subunit 131 is coupled to communication interfaces of the mobile machine 100, for example, network interface(s) 1311 for the mobile machine 100 to communicate with the control device 200 via network(s) and I/O interface(s) 1312 (e.g., a physical button), and the like. The actuation subunit 132 is coupled to component(s)/device(s) for implementing the motions of the mobile machine 100 by, for example, actuating motor(s) M of wheels and/or joints of the mobile machine 100. The communication subunit 131 may include controllers for the above-mentioned communication interfaces of the mobile machine 100, and the actuation subunit 132 may include controller(s) for the above-mentioned component(s)/device(s) for implementing the motions of the mobile machine 100. In other embodiments, the communication subunit 131 and/or actuation subunit 132 may just abstract component for representing the logical relationships between the components of the mobile machine 100.

The mobile machine 100 may further include a sensor subunit 133 which may include a set of sensor(s) and related controller(s), for example, the camera C and an IMU (inertial measurement unit) U (or an accelerometer and a gyroscope), for detecting the environment in which it is located to realize its navigation. The sensor subunit 133 communicates with the control unit 130 over one or more communication buses or signal lines that may be the same or at least partially different from the above-mentioned one or more communication buses or signal lines L. In other embodiments, in the case that the navigation module 121 is the above-mentioned navigation unit, the sensor subunit 133 may communicate with the navigation unit over one or more communication buses or signal lines that may be the same or at least partially different from the above-mentioned one or more communication buses or signal lines L. In addition, the sensor subunit 133 may just abstract component for representing the logical relationships between the components of the mobile machine 100.

In some embodiments, the map builder 1211, the path planner(s) 1212, the sensor subunit 133, and the motor(s) M (and wheels and/or joints of the mobile machine 100 coupled to the motor(s) M) jointly compose a (navigation) system which implements map building, (global and local) path planning, and motor actuating so as to realize the navigation of the mobile machine 100. In addition, the various components shown in FIG. 2 may be implemented in hardware, software or a combination of both hardware and software. Two or more of the processing unit 110, the storage unit 120, the control unit 130, the navigation module 121, and other units/subunits/modules may be implemented on a single chip or a circuit. In other embodiments, at least a part of them may be implemented on separate chips or circuits.

Figure 3:
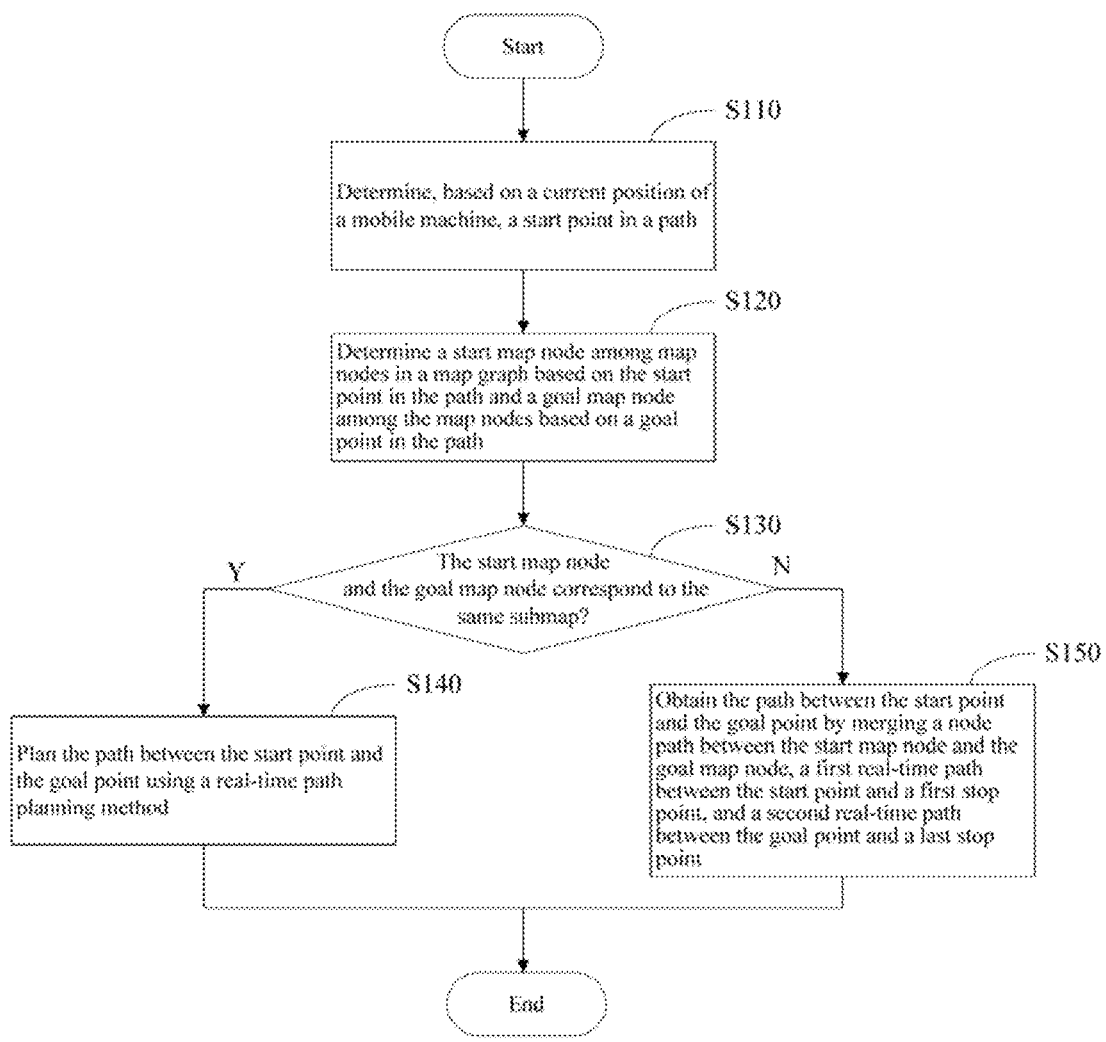
FIG. 3 is a flow chart of an example of path planning for the mobile machine of FIG. 2.

FIG. 3 is a flow chart of an example of path planning for the mobile machine 100 of FIG. 2. In some embodiments, a path planning method for the mobile machine 100 is implemented in the mobile machine 100 to plan a path (which includes, for example, the above-mentioned node path $T_n$, first real-time path $T_{r1}$, and second real-time path $T_{r2}$ in FIG. 12) for the mobile machine 100 by, for example, storing (sets of) instructions $I_c$ corresponding to the path planning method as the path planner(s) 1212 in the storage unit 120 and executing the stored instructions $I_c$ through the processing unit 110, and then the mobile machine 100 can be navigated according to the planned path. The path planning method may be performed in response to, for example, the request for the navigation and/or the path planning of the mobile machine 100 from, for example, (the navigation/operation system of) the mobile machine 100 itself or the control device 200, and may simultaneously consider the obstacles (e.g., the obstacle O) detected through the camera C and/or the Lidar R. of the mobile machine 100, then it may also be re-performed in response to, for example, having detected unexpected obstacles.

Accordingly, at step S110, the start point in the path is determined based on a current position of the mobile machine 100. In some embodiments, the current position of the mobile machine 100 may be obtained by, for example, estimating using data collected by the IMU U, and the obtained current position may be used as the start point. Furthermore, the current position of the mobile machine 100 may also be obtained by using or combing indoor localization means such as Bluetooth-based localization, Wi-Fi-based localization, acoustic-based localization, ultra-wideband (UWB) technology, and radio-frequency identification (RFID) technology.

At step S120, a start map node among the map nodes in the map graph is determined based on the start point in the path, and a goal map node among the map nodes is determined based on the goal point in the path. The map graph (e.g., map graph $G_2$ in FIG. 6) is a code structure implemented in a navigation code stack, which facilitates the connection logic between different submaps. Each of the map nodes corresponds to each submap partitioned from a facility map. The facility map (e.g., the map of the facility 1000) is an initial facility map such as a complete and current map of the entire facility which covers all departments and areas may be used for submap partitioning.

Figure 4:
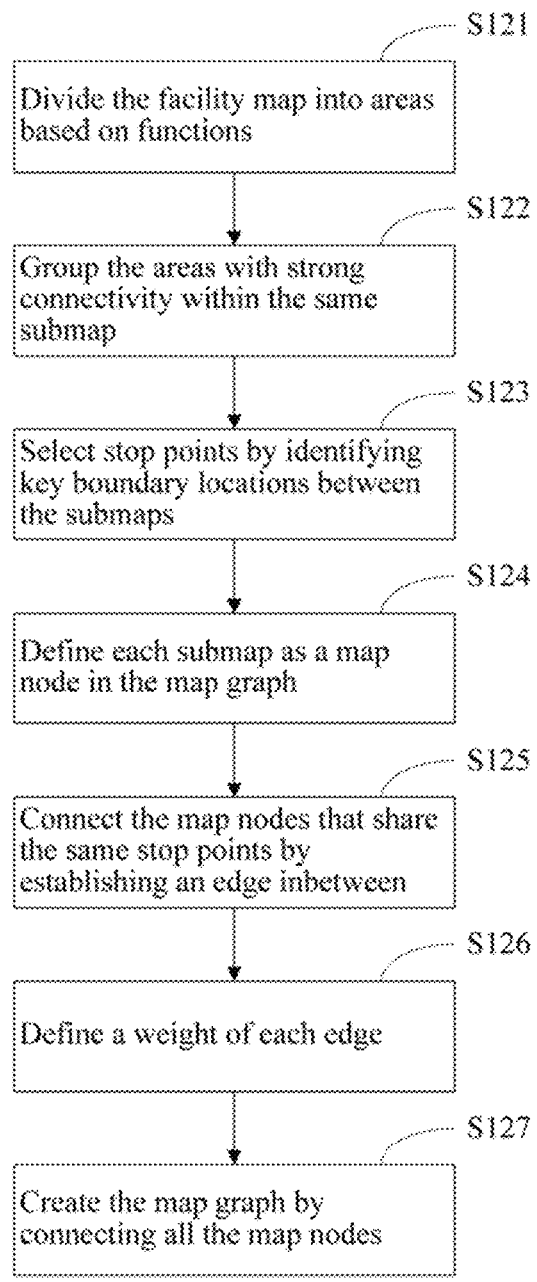
FIG. 4 is a flow chart of an example of constructing a map graph according to some embodiments of the present disclosure.
Figure 5:
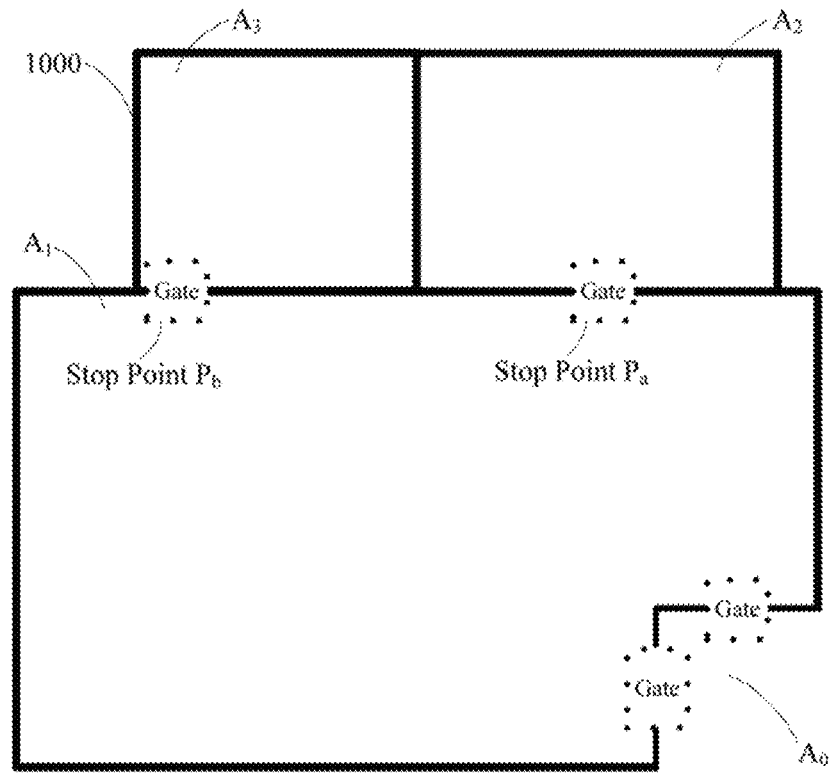
FIG. 5 is a schematic diagram of an example of partitioning the map of the facility of FIG. 1 into submaps to create map graph.
Figure 5:
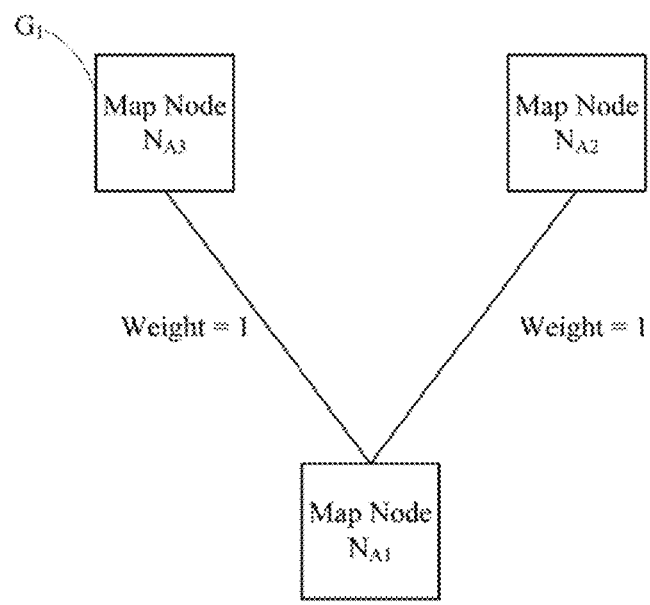

FIG. 4 is a flow chart of an example of constructing a map graph according to some embodiments of the present disclosure. At step S121, the facility map is divided into areas based on functions. In some embodiments, the whole facility map (of the facility 1000) may be divided based on connectivity functions. In other embodiments, the whole facility map (of the facility 1000) may be divided based on other functions such as traffic functions. FIG. 5 is a schematic diagram of an example of partitioning the map of the facility 1000 of FIG. 1 into submaps to create a corresponding map graph $G_1$. The map of the facility 1000 is divided, according to connectivity provided by the gates of the main buildings of the facility 1000, into areas $A_1$, $A_2$, and $A_3$ as shown in the upper part of FIG. 5. The map of the facility 1000 may be partitioned into the submaps manually, or automatically by, for example, using machine learning. In other embodiments, in the case that the facility 1000 includes the areas beside the main buildings of the facility 1000, other areas such as area $A_0$ as shown in the upper part of FIG. 5 may also be divided from the facility 1000.

At step S122, the areas with strong connectivity are grouped within the same submap. Generally, the objective of grouping is to strike a balance, avoiding excessively large submaps that might result in prolonged navigation times, thereby preventing a scenario where a single point-to-point navigation consumes an impractical amount of system processing time (e.g., exceeding a 5-minute threshold). So, for enhancing overall navigation efficiency to ensure a timely and effective system operation, it may consider factors such as total navigation time to ensure that the maximum distance of the longest path within each submap is manageable (e.g., to have a navigation duration that aligns with a reasonable range). Comprehensive information on the connectivity of the facility, for example, entrances, corridors, elevators, and traffic flow may be used to determine the connectivity. Areas $A_1$, $A_2$, and $A_3$ that are divided according to the connectivity provided by the gates of the main buildings of the facility 1000 is grouped as a submap, respectively, according to the physical connectivity and the connectivity through the neighboring corridors among the rooms in each area, while area $A_0$ that is beside the main buildings is grouped within the same submap with area $A_1$ in the main building because of their connectivity through the gate between area $A_0$ and area $A_1$. A local map is created for each submap. These local maps are reconstructed with a focus on the specific range and characteristics of each submap, facilitating more precise navigation and path planning. In some embodiments, the specifications and technical infrastructure such as size, speed, battery life, sensor range of the mobile machine 100 may also be used to determine the submap so as to ensure that the mobile machine 100 moves and perform tasks well within the submap.

At step S123, stop points are selected by identifying key boundary locations between the submaps. The selected stop points is set as map relocalization points for the mobile machine 100. In some embodiments, the key boundary locations may be, for example, entrances, corridors, elevators, and nurse stations. The above-mentioned comprehensive information on the connectivity of the facility may also be used to determine the stop points. As a key boundary location (i.e., an entrance) between area $A_1$ and area $A_2$, the gate between area $A_1$ and area $A_2$ is selected as stop point $P_a$; and as a key boundary location (i.e., an entrance) between area $A_1$ and area $A_3$, the gate between area $A_1$ and area $A_3$ is selected as stop point $P_b$.

At step S124, each submap is defined as a map node in the map graph. The above-mentioned submaps corresponding to the areas $A_1$, $A_2$, and $A_3$ are defined as map node $N_{A1}$, map node $N_{A2}$, and map node $N_{A3}$ of the map graph $G_1$, respectively, as shown in the lower part of FIG. 5.

At step S125, the map nodes that share the same stop points are connected by establishing an edge inbetween. As shown in the lower part of FIG. 5, an edge is established according to the connectivity between map node $N_{A1}$ and map node $N_{A2}$, and another edge is established according to the connectivity between map node $N_{A1}$ and map node $N_{A3}$.

At step S126, a weight (cost) of each edge is defined. For setting realistic edge costs, the weights may be defined based on factors of the facility 1000 such as connectivity, physical distance, traffic pattern/density, usage pattern, and other relevant parameters, thereby realizing efficient and timely navigation. As shown in the lower part of FIG. 5, according to the connectivity between map node Nat and map node $N_{A2}$, a weight of 1 is defined for the edge therebetween, and according to that between map node $N_{A1}$ and map node $N_{A3}$, a weight of 1 is defined for the edge therebetween, too.

At step S127, the map graph is created by connecting all the map nodes. If there's any map node of the map graph $G_1$ not be connected in step S125, it will be connected to create the complete map graph $G_1$.

Figure 6:
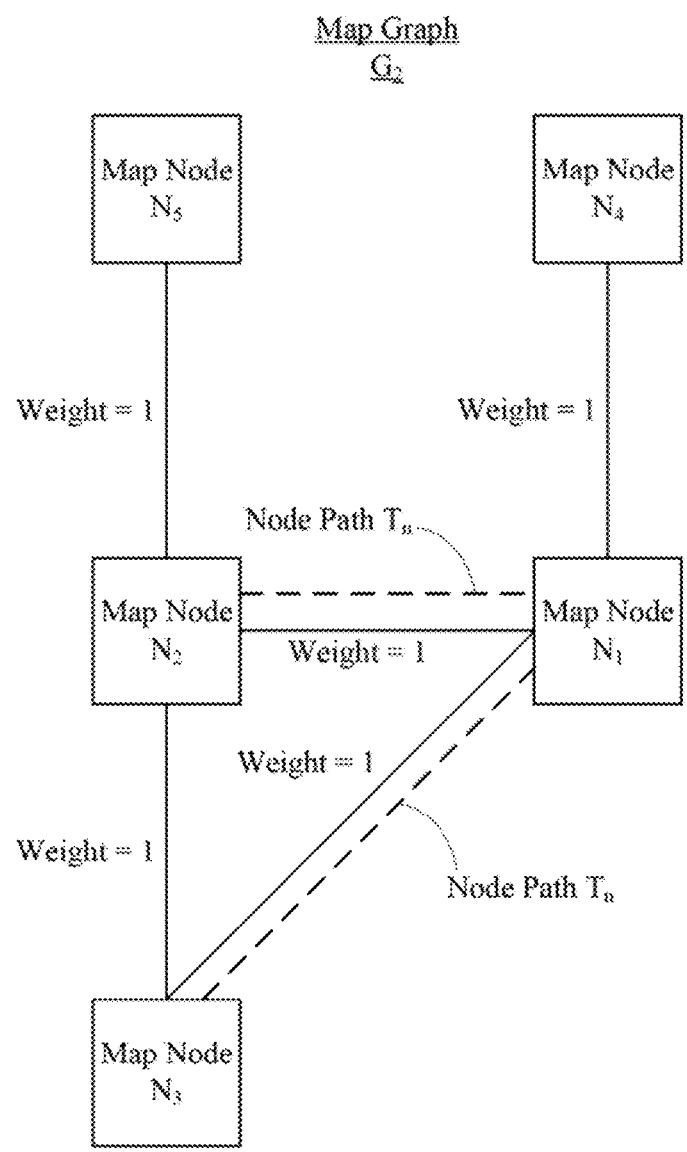
FIG. 6 is a schematic diagram of another example of partitioning the map of the facility of FIG. 1 into submaps to create a corresponding map graph.
Figure 7A:
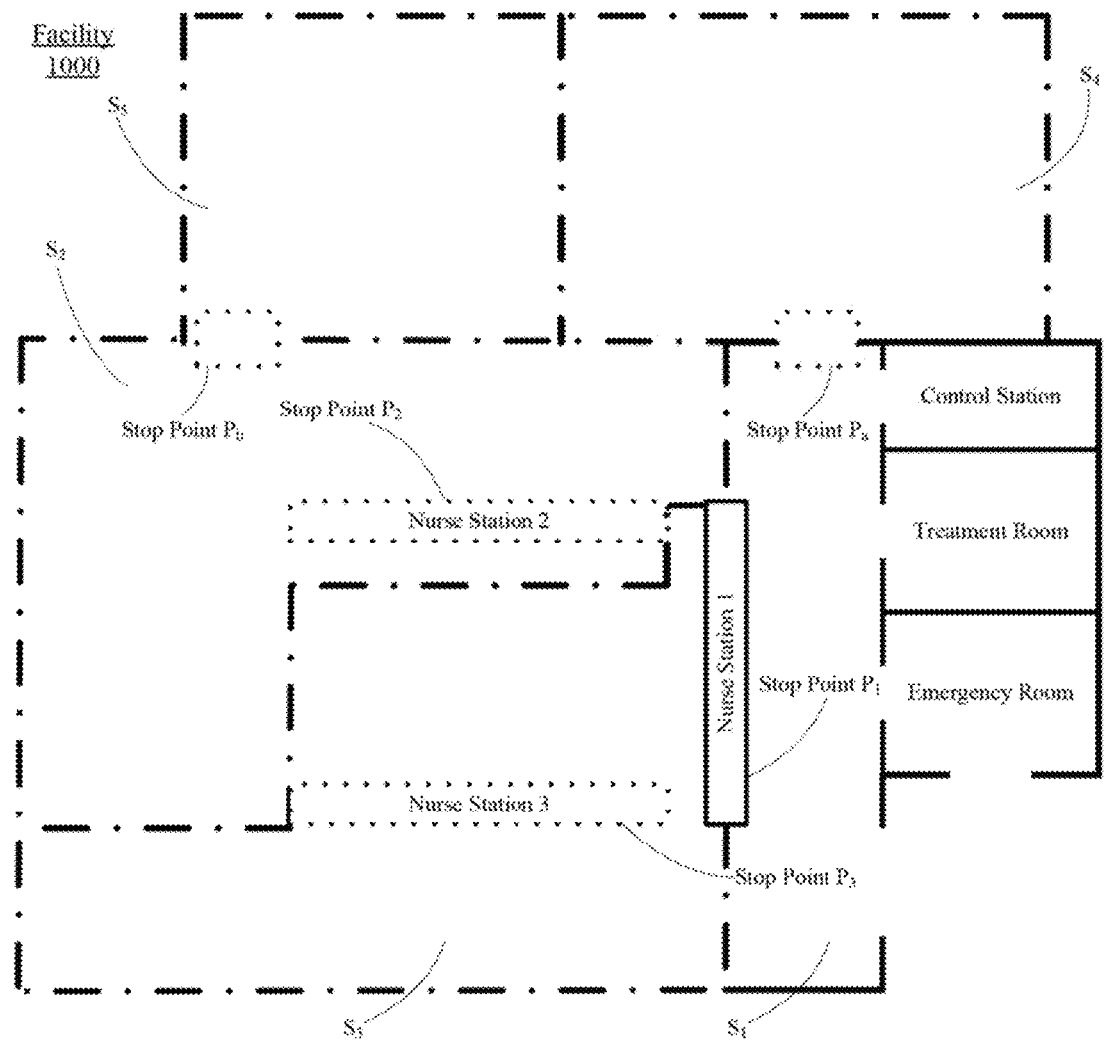
FIG. 7A, FIG. 7B, and FIG. 7C are schematic diagrams of submaps and the corresponding stop points of the map of the facility of FIG. 1.
Figure 7B:
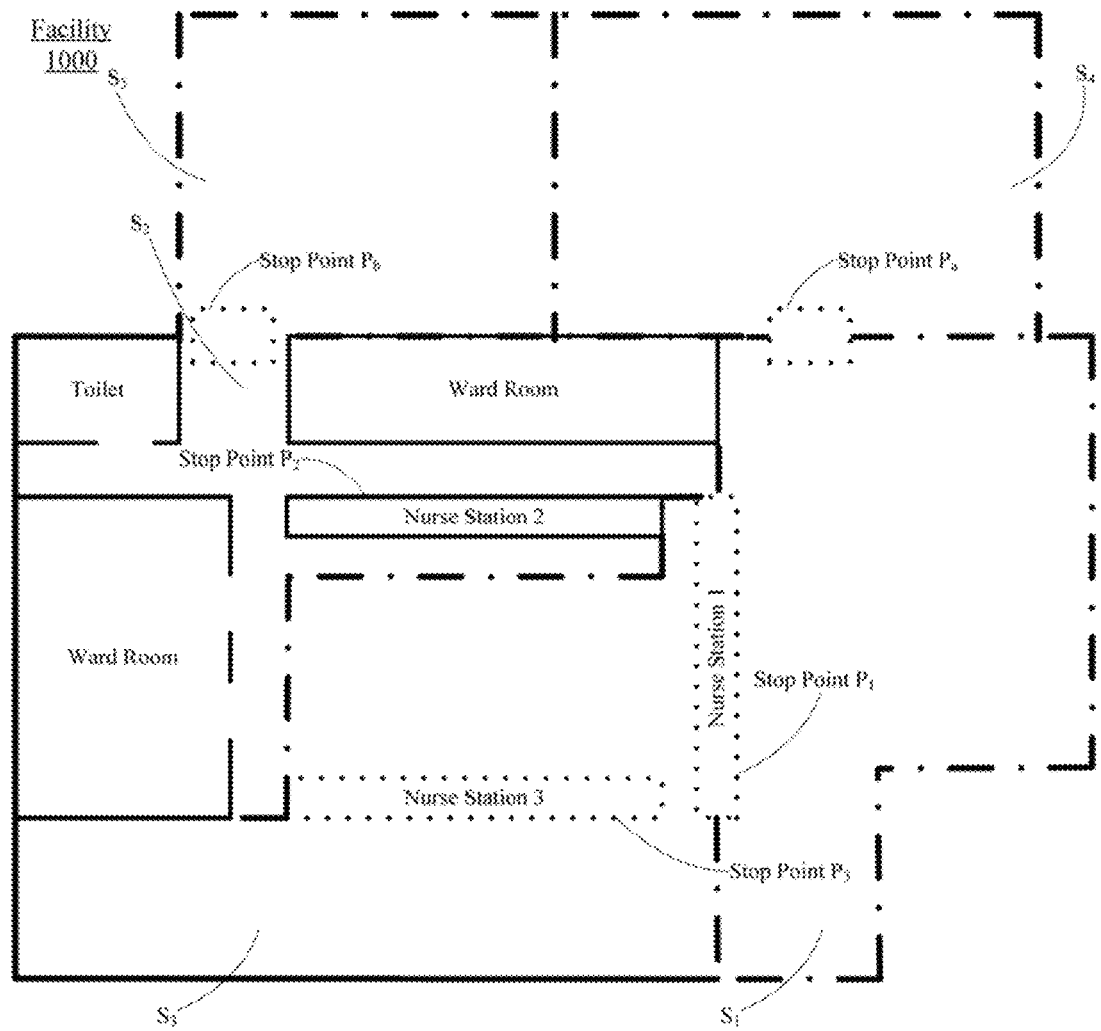
Figure 7C:
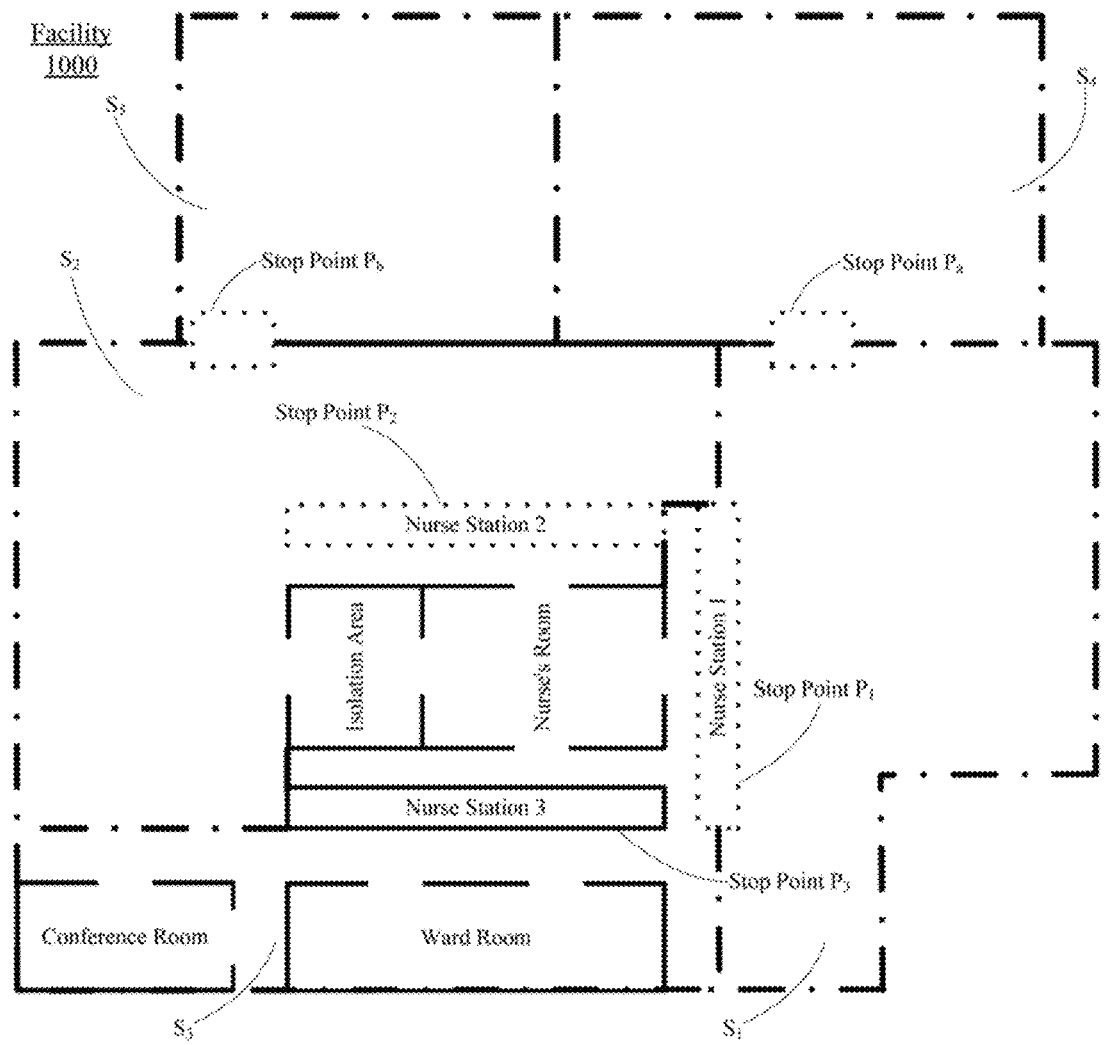

In other embodiments, the whole facility map (of the facility 1000) may also be divided based on other functions such as departmental medical functions so as to create another map graph. FIG. 6 is a schematic diagram of another example of partitioning the map of the facility 1000 of FIG. 1 into submaps to create a corresponding map graph $G_2$. The map graph $G_2$ includes map nodes $N_{41}$-$N_{45}$ that has more map nodes than the map graph $G_1$. FIG. 7A, FIG. 7B, and FIG. 7C are schematic diagrams of submaps and the corresponding stop points of the map of the facility 1000 of FIG. 1. The map of the facility 1000 is partitioned into submaps $S_1$-$S_5$. Specifically, the map of the facility 1000 is divided, according to departmental medical functions, into areas with ranges such as individual rooms like ward room, operating room, treatment room, and emergency room, then the areas are grouped into submaps $S_1$-$S_5$ according to strong connectivity between the adjacent areas. Due to their high function and traffic, the nursing station and its surroundings may be treated as a distinct submap, with an elevated cost. Therefore, it may avoid routing through nursing stations unless necessary (e.g., when docking stations exceed three). By considering both functionality and traffic density in healthcare environments, the navigation of the mobile machine 100 can be optimized. In addition, by situating the mobile machine 100 near the nursing stations complete with docking stations, it not only ensures the convenience of the deployment of the mobile machine 100 but also facilitates the seamless involvement of nurses. Nurse station 1, nurse station 2, and nurse station 3 that are areas each including counter, medical equipment, charging station/docking station for the mobile machine 100, passageway, and the like are selected as stop points because they are key boundary locations among submaps while having functions such as medical supply and charging. As the key boundary location between submap $S_1$ and submap $S_2$ as well as submap $S_3$, nurse station 1 is selected as stop point $P_1$; as the key boundary location between submap $S_2$ and submap $S_1$ as well as submap $S_3$, nurse station 2 is selected as stop point $P_2$; and as the key boundary location between submap $S_3$ and submap $S_1$ as well as submap $S_2$, nurse station 3 is selected as stop point $P_3$. Given that nurses typically play a central role in daily robot planning and patient interaction, designating the nursing stations as stop points emerges as a pivotal decision. This not only enhances the accessibility and usability of the mobile machine 100 but also aligns with the workflow and needs of the healthcare professionals in the environment.

In submap $S_1$ (FIG. 7A), there are the physical connectivity between the treatment room and the emergency room and that between the treatment room and the control station, and their connectivity with nurse station 1 through the corridor inbetween. In submap $S_2$ (FIG. 7B), there are the connectivity among the two ward rooms, the toilet, and the nurse station 2 through the neighboring corridors. In submap $S_3$ (FIG. 7C), there are the physical connectivity between the nurse's room and the isolation area, their connectivity with the nurse station 3 through the corridor inbetween, and the connectivity among the nurse station 3, the ward room, and the conference room through the neighboring corridors. In submap $S_4$ and $S_5$, there are the physical connectivity and the connectivity through the neighboring corridors among the related rooms. Submaps $S_1$-$S_5$ are defined as map nodes $N_1$-$N_5$ of the map graph $G_2$, respectively. According to the connectivity, edges between map nodes $N_1$-$N_5$, are established. The weight of each edge is defined based on the connectivity between $N_1$-$N_5$, and a weight of 1 is defined, respectively. In other embodiments, the edges related to the areas with high-risk potential may be assigned higher weights so as to minimize potential risks by excluding them from the path planning process.

At step S130, whether the start map node and the goal map node correspond to the same submap or not is determined. In other words, whether the start map node and the goal map node are the same map node in the map graph or not is determined. If yes, it means that the mobile machine 100 is located at (the start point of) the submap where the goal point is located, and step S140 will be executed; otherwise, step S150 will be executed.

At step S140, the path between the start point and the goal point is planned using a real-time path planning method. If the mobile machine 100 is located at the submap where the goal point is located, the path between the start point and the goal point is planned using the real-time path planning method.

At step S150, the path between the start point and the goal point is obtained by merging a node path $T_n$ (see FIG. 6 and FIG. 12) between the start map node and the goal map node, a first real-time path $T_{r1}$ (see FIG. 12 and FIG. 10) between the start point and a first stop point which connects the adjacent submaps between the start point and the goal point, and a second real-time path $T_{r2}$ (see FIG. 12 and FIG. 10) between the goal point and a last stop point which connects the adjacent submaps between the goal point and the start point. If the mobile machine 100 is not located at the submap where the goal point is located, the path between the start point and the goal point is obtained by merging the node path $T_n$, the first real-time path $T_{r1}$ between the start point and the first stop point, and the second real-time path $T_{r2}$ between the goal point and the last stop point. The node path $T_n$ between the start map node and the goal map node is planned using a graph search algorithm (e.g., Dijkstra's algorithm). Because the start point and the goal point can be dynamic and located anywhere within the environment of the mobile machine 100, the real-time path from the start point to the first stop point (i.e., the first real-time path $T_{r1}$) and that from the last stop point to the goal point (i.e., the second real-time path $T_{r2}$) are planned using the above-mentioned real-time path planning method or other real-time path planning method. The stop point (e.g., stop point $P_a$ in FIG. 5) connects the adjacent submaps (e.g., the submap of area $A_1$ and the submap of area $A_2$ in FIG. 5), which is between the start point and the goal point. Each of the stop points signifies a connection point for intersecting submaps (i.e., it serves as a connection point for common areas between two or more submaps). By merging the node path obtained by high-level path planning and the real-time path obtained by real-time path planning, the continuous path between the start point and the goal point is created.

The above-mentioned path planning method as a critical component of autonomous navigation is enhanced by considering large-scale navigation scenarios such as hospital. Beyond prioritizing the shortest distance, it takes into account various factors including traffic conditions and the nature of specific areas (e.g., emergency zones with frequent bed movements). Therefore, it is specific for planning paths of a mobile machine in large/complex indoor facilities, which has novel considerations in emergency protocols, unpredictable dynamic obstacles, and fast re-planning in real-time, and is applicable for indoor areas with crowded human traffic.

Figure 8:
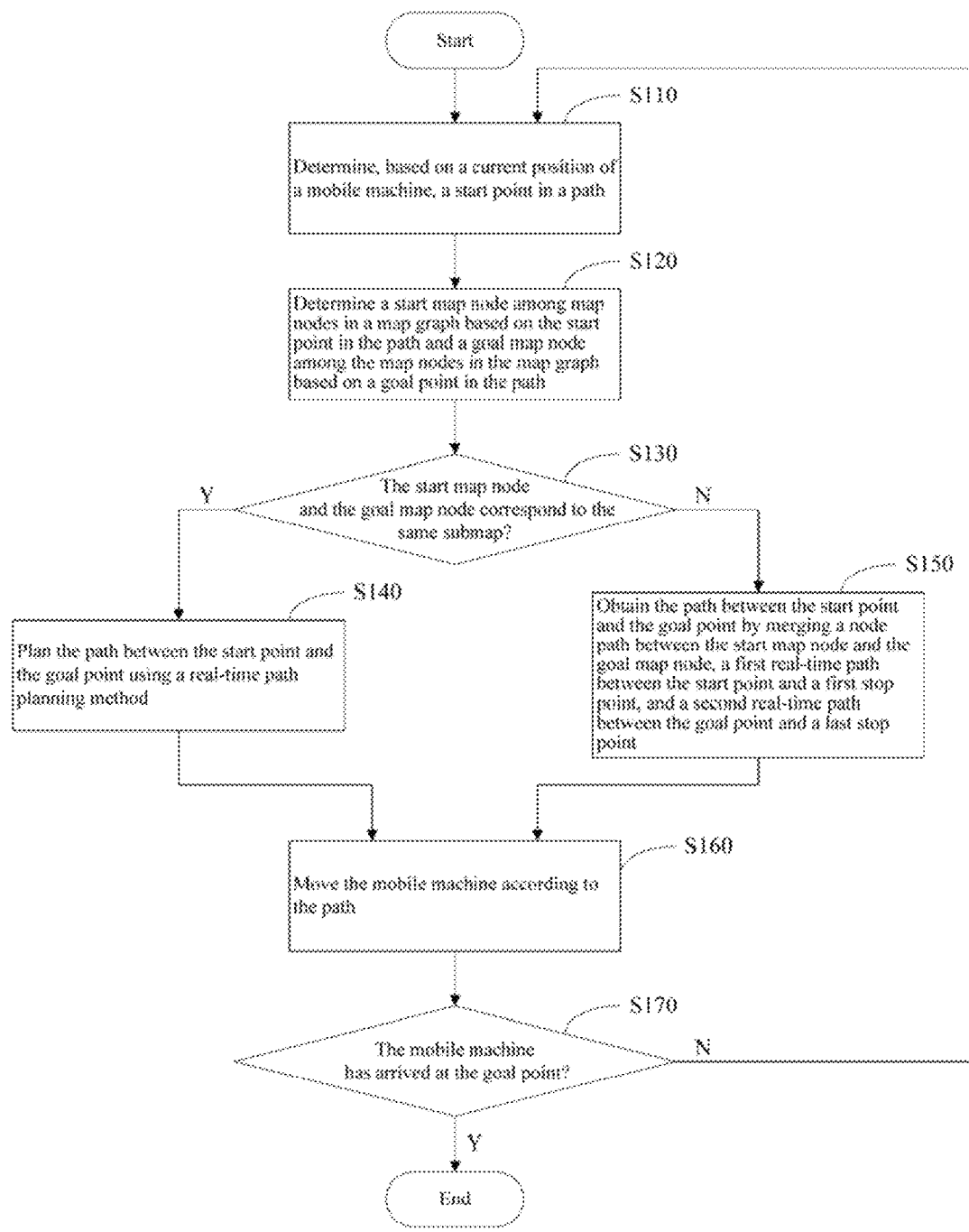
FIG. 8 is a flow chart of an example of navigating the mobile machine of FIG. 2.

FIG. 8 is a flow chart of an example of navigating the mobile machine 100 of FIG. 2. In some embodiments, a navigation method for the mobile machine 100 is implemented in the mobile machine 100 to plan a path and move the mobile machine 100 according to the planned path by, for example, storing (sets of) instructions $I_n$ corresponding to the navigation method in the storage unit 120 and executing the stored instructions $I_n$ through the processing unit 110. Steps S110-S150 which plan a path (e.g., the above-mentioned node path $T_n$, first real-time path $T_{r1}$, and second real-time path $T_{r2}$ in FIG. 12) for the mobile machine 100 are the same as that in FIG. 3, which will not be described again herein. At step S160, the mobile machine 100 is moved according to the planned/obtained path. The mobile machine 100 may be kept moving according to the planned/obtained path until, for example, an obstacle is detected or a request of re-planning the path is received. At step S170, whether the mobile machine 100 has arrived at the goal point or not is determined. If yes, the navigation method ends; otherwise, for example, the mobile machine 100 enters a new submap, it will return to step 110 so as to re-plan the path. This navigation method enables the navigation process to focus solely on the journey from the start point to the first stop point and from the last stop point to the goal point by breaking down the whole facility map into different submaps, while the existing navigation method poses challenges in large-scale navigation due to its time-consuming nature.

Figure 9:
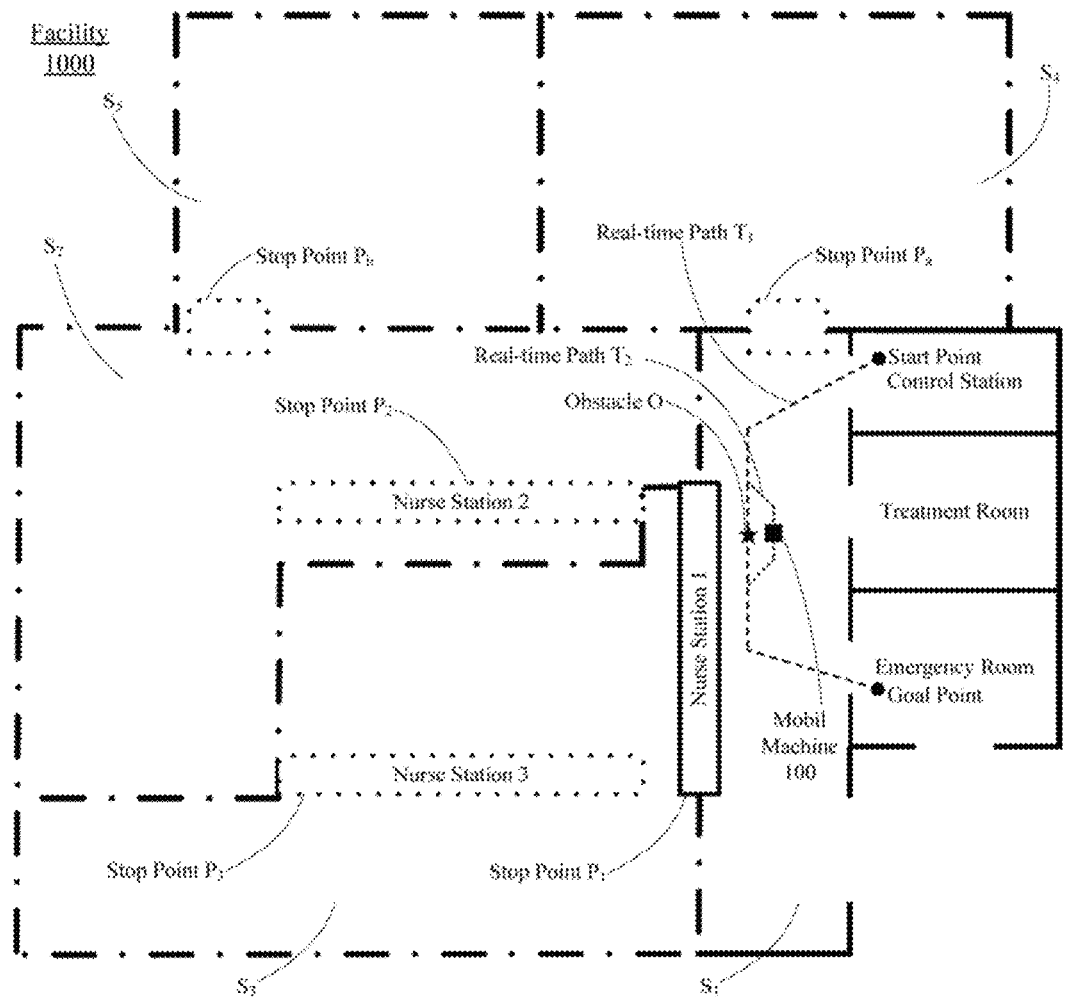
FIG. 9 is a schematic diagram of an example of navigating the mobile machine of FIG. 2 within a submap.

FIG. 9 is a schematic diagram of an example of navigating the mobile machine 100 of FIG. 2 within a submap. Because the start map node and the goal map node correspond to the same submap, that is, the mobile machine 100 is at (the start point in) the submap where the goal point is located (i.e., submap $S_1$), real-time path $T_1$ between the start point and the goal point is planned using the real-time path planning method (step S140). In the real-time path planning method, the planned real-time path may be re-planned when, for example, an obstacle is detected by the mobile machine 100. For example, real-time path $T_2$ between the start point and the goal point that can avoid the obstacle O (e.g., a suddenly appeared human) is planned after the mobile machine 100 detected the obstacle O.

Figure 10:
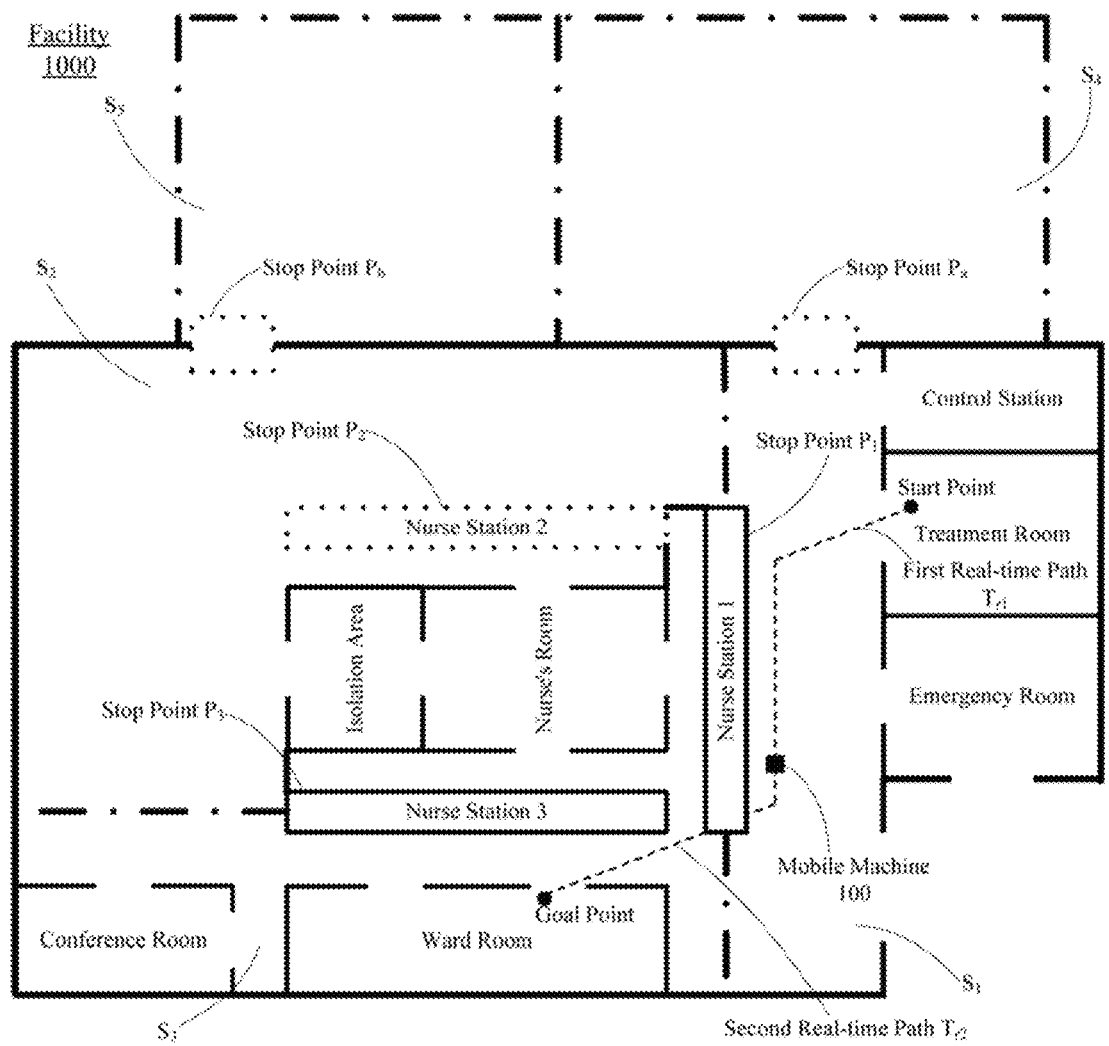
FIG. 10 is a schematic diagram of an example of navigating the mobile machine of FIG. 2 between two adjacent submaps.

FIG. 10 is a schematic diagram of an example of navigating the mobile machine 100 of FIG. 2 between two adjacent submaps. The mobile machine 100 is navigated from the start point in submap $S_1$ to the goal point in submap $S_3$. Because the start map node and the goal map node not correspond to the same submap, that is, the mobile machine 100 is not at (the start point in) the submap where the goal point is located (i.e., submap $S_3$), the path between the start point and the goal point is obtained by merging the node path $T_n$ between the start map node and the goal map node, the first real-time path $T_{r1}$ between the start point and a first stop point (i.e., the stop point $P_1$) connecting the adjacent submaps (i.e., submap $S_1$ and submap $S_3$) between the start point and the goal point, and the second real-time path $T_{r2}$ between the goal point and a last stop point (i.e., the stop point $P_1$) connecting the adjacent submaps between the goal point and the start point, (step S150). The node path $T_n$ is a path from map node $N_1$ which corresponds to submap $S_1$ where the start point is located to map node $N_3$ which corresponds to submap $S_3$ where the goal point is located (see FIG. 6). Between the first real-time path $T_{r1}$ in submap $S_1$ and the second real-time path $T_{r2}$ in submap $S_3$, there is the same stop point $P_1$ (i.e., nurse station 1).

Figure 11:
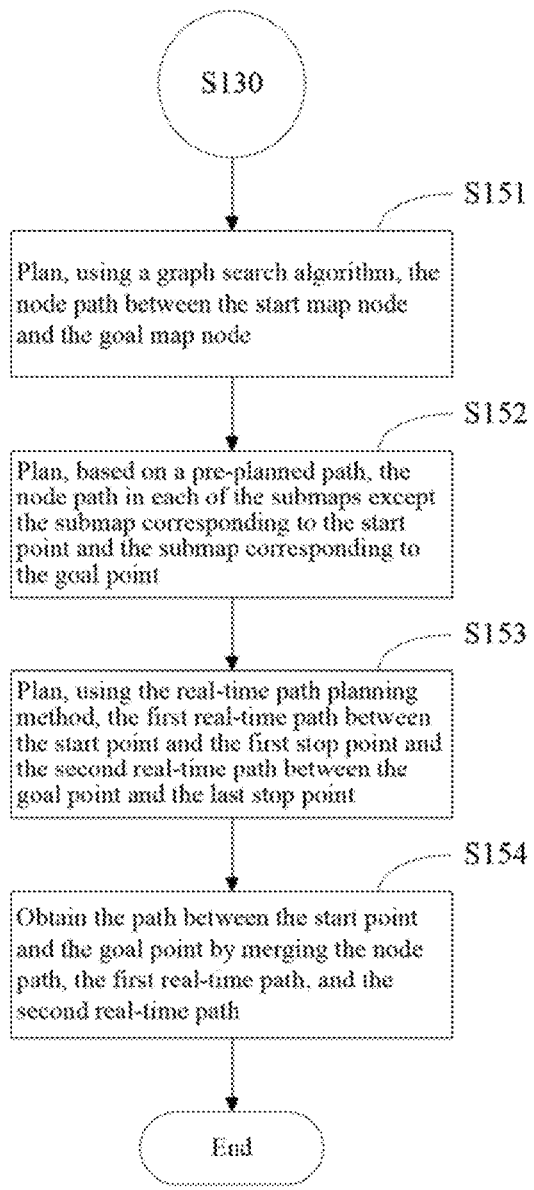
FIG. 11 is a flow chart of an example of planning the node path and the real-time path for merging in the path planning of FIG. 3.

Before merging, the node path $T_n$, the first real-time path $T_{r1}$, and the second real-time path $T_{r2}$ need to be planned first. FIG. 11 is a flow chart of an example of planning the node path and the real-time path for merging in the path planning of FIG. 3. At step S151, the node path $T_n$ between the start map node and the goal map node is planned using the graph search algorithm. According to map graph $G_2$, because there is only one path between map node $N_1$ and map node $N_2$: map node $N_1$-map node $N_2$, which is simply the shortest path to take as the node path $T_n$ (see FIG. 6). FIG. 12 is a schematic diagram of an example of navigating the mobile machine 100 of FIG. 2 across at least three submaps. The mobile machine 100 is navigated from the start point in submap $S_6$ to the goal point in submap $S_5$. According to map graph $G_2$, because the shortest path between map node $N_5$ which corresponds to submap $S_5$ and map node $N_4$ which corresponds to submap $S_4$ is: map node $N_5$-map node $N_2$-map node $N_1$-map node $N_4$, this shortest path is planned to take as the node path $T_n$ (see FIG. 6 and FIG. 12).

At step S152, the node path $T_n$ in each of the submaps except the submap corresponding to the start point (i.e., the First Submap) and the submap corresponding to the goal point (i.e., the Last Submap) is planned based on a pre-planned path $T_p$. It should be noted that the node path $T_n$ includes the path between map nodes (see FIG. 6 and FIG. 12) and the path in each submap (corresponding to a single map node) (see FIG. 12). The pre-planned path $T_p$ is saved in (a cache of) the storage unit 120 of the mobile machine 100, which is created once based on the facility map (e.g., the map of the facility 1000) during the initialization of the navigation module 121, optimizing time for large-scale distance navigation. The submap at which the start point is located is called the First Submap, the submap at which the stop point is located is called the Last Submap, and the submaps between the First Submap and the Last Submap are called Intermediate Submaps: The node path $T_n$ in each of the Intermediate Submaps that is between the two stop points of the Intermediate Submaps. Accordingly, in the case of FIG. 12, for the Intermediate Submaps (i.e., submap $S_2$ and submap $S_1$ in FIG. 12), the pre-planned path $T_p$ in submap $S_2$ that is between stop point $P_b$ and stop point $P_1$ (i.e., nurse station 1) is planned in advance, and the pre-planned path $T_p$ in submap $S_1$ that is between stop point $P_1$ and stop point $P_a$ (i.e., the gate between submap $S_1$ and submap $S_4$) is planned in advance. The pre-planned path $T_p$ in submap $S_2$ is taken as the node path $T_n$ in submap $S_2$, and the pre-planned path $T_p$ in submap $S_1$ is taken as the node path $T_n$ in submap $S_1$.

At step S153, the first real-time path $T_{r1}$ between the start point and the first stop point and the second real-time path $T_{r2}$ between the goal point and the last stop point are planned. Accordingly, the first real-time path $T_{r1}$ in submap $S_5$ where the start point is located is planned, and the second real-time path $T_{r2}$ in submap $S_4$ where the goal point is located is planned (see FIG. 12).

At step S154, the path between the start point and the goal point is obtained by merging the node path $T_n$, the first real-time path $T_{r1}$, and the second real-time path $T_{r2}$. Accordingly, the continuous path between the start point in submap $S_5$ and the goal point in submap Sa is obtained by merging the node path $T_n$ between the start map node (i.e., map node $N_5$) and the goal map node (i.e., map node $N_4$) (and the node path $T_n$ in each of submap $S_2$ and submap $S_1$), the first real-time path $T_{r1}$ in submap $S_5$, and the second real-time path $T_{r2}$ in submap $S_4$ (see FIG. 12). By appropriately incorporating the pre-planned path into the high-level path planning that plans the node path between map nodes, the efficiency for navigating within a single submap is optimized. Because the paths between the stop points remain constant once determined, the navigation of the mobile machine 100 between the stop points can be efficiently optimized by planning path using the pre-planned paths. In some embodiments, traffic considerations may be taken into account by, for example, leveraging nursing stations. As the shortest path intersects with a nursing station which will result in heavier traffic, a longer but smoother route may be selected.

Figure 13:
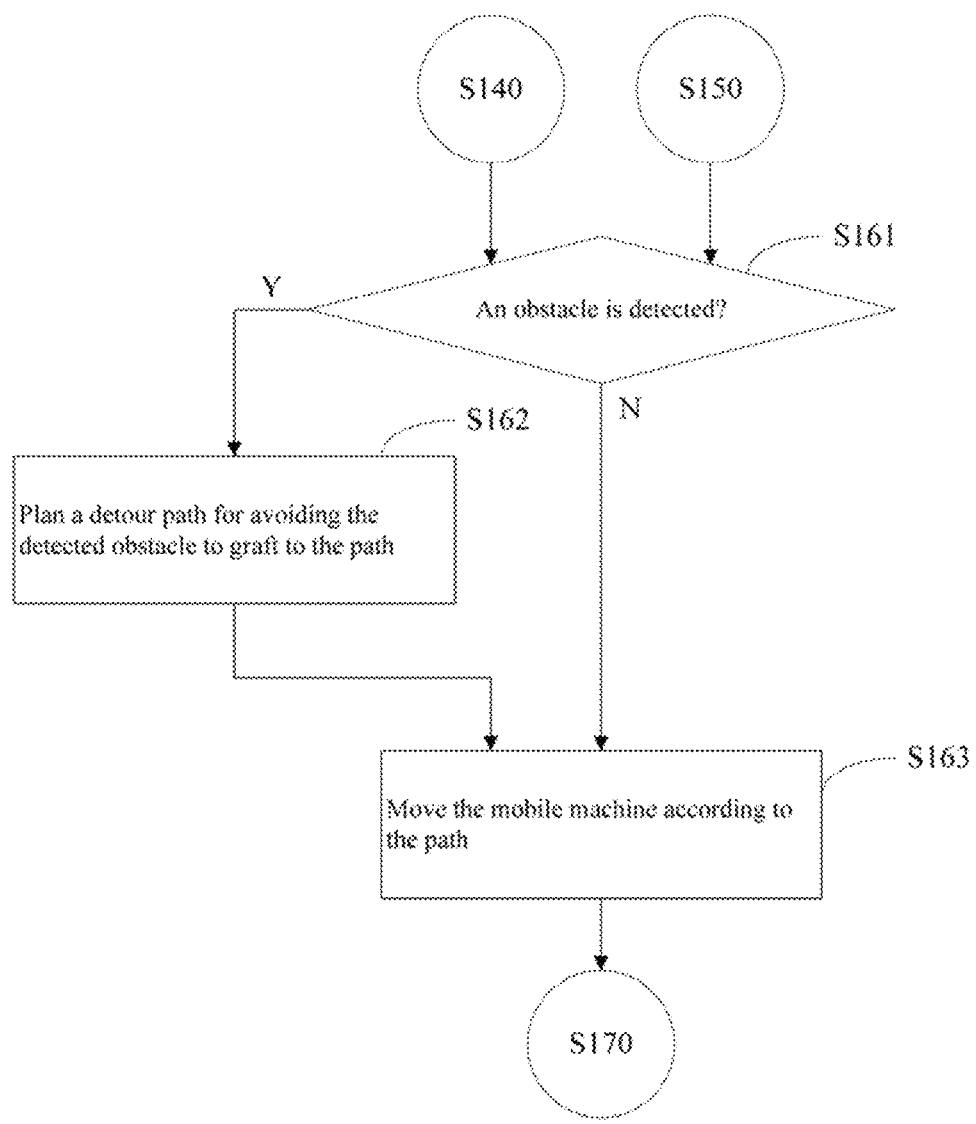
FIG. 13 is a flow chart of an example of moving the mobile machine of FIG. 2 in the navigation of FIG. 8.

FIG. 13 is a flow chart of an example of moving the mobile machine 100 of FIG. 2 (step S160) in the navigation of FIG. 8. At step S161, whether an obstacle (e.g., human, furniture, and garbage) (see the obstacle O in FIG. 9) is detected by (the camera C and/or the Lidar R of) the mobile machine 100 or not is determined. If yes, step S162 will be executed; otherwise, step S163 will be executed.

At step S162, a detour path for avoiding the detected obstacle is planned, and the planned detour path is graft to the planned/obtained path. At step 163, the mobile machine 100 is moved according to the planned/obtained/grafted path.

The navigation method uses the path planned by the above-mentioned path planning method, which is specific for navigating the mobile machine 100 in large/complex indoor facilities. With novel considerations in emergency protocols, unpredictable dynamic obstacles, and fast re-planning in real-time, which is applicable for indoor areas with crowded human traffic. The navigation method can efficiently achieve real-time navigation and be compatible to most commercially mobile machines such as mobile robots.

It can be understood by those skilled in the art that, all or part of the method in the above-mentioned embodiment(s) can be implemented by one or more computer programs to instruct related hardware. In addition, the one or more programs can be stored in a non-transitory computer readable storage medium. When the one or more programs are executed, all or part of the corresponding method in the above-mentioned embodiment(s) is performed. Any reference to a storage, a memory, a database or other medium may include non-transitory and/or transitory memory. Non-transitory memory may include read only memory (ROM), programmable ROM (PROM), electrically programmable ROM (EPROM), electrically erasable programmable ROM (EEPROM), flash memory, solid-state drive (SSD), or the like. Volatile memory may include random access memory (RAM), external cache memory, or the like.

The processing unit 110 (and the above-mentioned processor) may include central processing unit (CPU), or be other general purpose processor, graphics processing unit (GPU), digital signal processor (DSP), application specific integrated circuit (ASIC), field-programmable gate array (FPGA), or be other programmable logic device, discrete gate, transistor logic device, and discrete hardware component. The general purpose processor may be microprocessor, or the processor may also be any conventional processor. The storage unit 120 (and the above-mentioned memory) may include internal storage unit such as hard disk and internal memory. The storage unit 120 may also include external storage device such as plug-in hard disk, smart media card (SMC), secure digital (SD) card, and flash card.

The exemplificative units/modules and methods/steps described in the embodiments may be implemented through software, hardware, or a combination of software and hardware. Whether these functions are implemented through software or hardware depends on the specific application and design constraints of the technical schemes. The above-mentioned path planning method and mobile machine may be implemented in other manners. For example, the division of units/modules is merely a logical functional division, and other division manner may be used in actual implementations, that is, multiple units/modules may be combined or be integrated into another system, or some of the features may be ignored or not performed. In addition, the above-mentioned mutual coupling/connection may be direct coupling/connection or communication connection, and may also be indirect coupling/connection or communication connection through some interfaces/devices, and may also be electrical, mechanical or in other forms.

The above-mentioned embodiments are merely intended for describing but not for limiting the technical schemes of the present disclosure. Although the present disclosure is described in detail with reference to the above-mentioned embodiments, the technical schemes in each of the above-mentioned embodiments may still be modified, or some of the technical features may be equivalently replaced, so that these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented method for planning a path between a start point and a goal point for a mobile machine, comprising:

determining, by a processor of the mobile machine, based on a current position of the mobile machine, the start point in the path;

determining, by the processor, a start map node among a plurality of map nodes in a map graph based on the start point in the path and a goal map node among the plurality of map nodes in the map graph based on the goal point in the path, wherein each of the map nodes corresponds to each of a plurality of submaps partitioned from a facility map;

determining, by the processor, whether the start map node and the goal map node correspond to the same submap;

planning, by the processor, the path between the start point and the goal point using a real-time path planning method, in response to the start map node and the goal map node corresponding to the same submap;

obtaining, by the processor, the path between the start point and the goal point by merging a node path between the start map node and the goal map node, a first real-time path between the start point and a first stop point connecting the adjacent submaps between the start point and the goal point, and a second real-time path between the goal point and a last stop point connecting the adjacent submaps between the goal point and the start point, in response to the start map node and the goal map node not corresponding to the same submap; and controlling, by the processor, the mobile machine to move according to the path;

wherein obtaining, by the processor, the path between the start point and the goal point includes:

planning, by the processor using a graph search algorithm, the node path between the start map node and the goal map node; and wherein obtaining, by the processor, the path between the start point and the goal point further includes:

planning, by the processor, based on a pre-planned path, the node path in each of the submaps except the submap corresponding to the start point and the submap corresponding to the goal point.

2. The method of claim 1, wherein the real-time path is planned using the real-time path planning method.

3. The method of claim 1, wherein obtaining, by the processor, the path between the start point and the goal point further includes:

planning, by the processor using the real-time path planning method, the first real-time path between the start point and the first stop point;

planning, by the processor using the real-time path planning method, the second real-time path between the goal point and the last stop point; and obtaining, by the processor, the path between the start point and the goal point by merging the node path, the first real-time path, and the second real-time path.

4. The method of claim 1, wherein, before obtaining, by the processor, the path between the start point and the goal point, the method further comprises:

establishing, by the processor, an edge between the map nodes corresponding to the same stop point.

5. The method of claim 4, wherein each of the edge has a cost representing one of connectivity, physical distance, and traffic density.

6. The method of claim 1, wherein the stop point corresponds to one of an entrance, a corridor, an elevator, and a nurse station.

7. The method of claim 1, wherein the facility map is for a health care institution, and the submaps are partitioned from the facility map based on departmental medical functions.

8. The method of claim 1, wherein the method further comprises:

providing the mobile machine, wherein the mobile machine further includes an inertial measurement unit electrically coupled to the processor; and wherein determining, by the processor of the mobile machine, based on the current position of the mobile machine, the start point in the path includes:

collecting, by the inertial measurement unit, data; and obtaining, by the processor, the current position of the mobile machine by estimating using the data collected by the inertial measurement unit, and using the current position of the mobile machine as the start point in the path.

9. A method for navigating a mobile machine according to a path between a start point and a goal point, comprising:

determining, based on a current position of the mobile machine, the start point in the path;

determining a start map node among a plurality of map nodes in a map graph based on the start point in the path and a goal map node among the plurality of map nodes in the map graph based on the goal point in the path, wherein each of the map nodes corresponds to each of a plurality of submaps partitioned from a facility map;

determining whether the start map node and the goal map node correspond to the same submap;

planning the path between the start point and the goal point using a real-time path planning method, in response to the start map node and the goal map node corresponding to the same submap;

obtaining the path between the start point and the goal point by merging a node path between the start map node and the goal map node, a first real-time path between the start point and a first stop point connecting the adjacent submaps between the start point and the goal point, and a second real-time path between the goal point and a last stop point connecting the adjacent submaps between the goal point and the start point, in response to the start map node and the goal map node not corresponding to the same submap;

moving the mobile machine according to the path;

determining whether the mobile machine has arrived the goal point or not; and returning to determining, based on the current position of the mobile machine, the start point in the path between the start point and the goal point, in response to the robot having not arrived the goal point;

wherein obtaining the path between the start point and the goal point includes:

planning, using a graph search algorithm, the node path between the start map node and the goal map node; and wherein obtaining the path between the start point and the goal point further includes:

planning, based on a pre-planned path, the node path in each of the submaps except the submap corresponding to the start point and the submap corresponding to the goal point.

10. The method of claim 9, wherein the real-time path is planned using the real-time path planning method.

11. The method of claim 9, wherein obtaining the path between the start point and the goal point further includes:

planning, using the real-time path planning method, the first real-time path between the start point and the first stop point;

planning, using the real-time path planning method, the second real-time path between the goal point and the last stop point; and obtaining the path between the start point and the goal point by merging the node path, the first real-time path, and the second real-time path.

12. The method of claim 9, wherein determining, based on the current position of the mobile machine, the start point in the path includes:

obtaining the current position of the mobile machine by estimating using data collected by an inertial measurement unit of the mobile machine, and using the current position of the mobile machine as the start point in the path.

13. The method of claim 9, wherein the facility map is for a health care institution, and the submaps are partitioned from the facility map based on departmental medical functions.

14. The method of claim 13, wherein the method further comprises:

dividing the facility map into areas based on the departmental medical functions;

obtaining the submaps by grouping the areas based on connectivity of the areas;

selecting stop points by identifying key boundary locations between the submaps;

defining each of the submaps as a map node in the map graph;

establishing an edge between the map nodes corresponding to the same stop point;

defining a weight of each edge; and creating the map graph by connecting all of the map nodes.

15. The method of claim 14, wherein the connectivity of the areas is determined based on connectivity of facility in each of the areas.

16. The method of claim 14, wherein the weight represents one of connectivity, physical distance, and traffic density, and wherein the key boundary locations include: entrances, corridors, elevators, and nurse stations.

17. A mobile machine, comprising:
one or more processors; and
one or more memories storing one or more programs configured to be executed by the one or more processors, wherein the one or more programs comprise instructions to:
determine, based on a current position of the mobile machine, a start point in a path;
determine a start map node among a plurality of map nodes in a map graph based on the start point in the path and a goal map node among the plurality of map nodes in the map graph based on a goal point in the path, wherein each of the map nodes corresponds to each of a plurality of submaps partitioned from a facility map;
determine whether the start map node and the goal map node correspond to the same submap;
plan the path between the start point and the goal point using a real-time path planning method, in response to the start map node and the goal map node corresponding to the same submap;
obtain the path between the start point and the goal point by merging a node path between the start map node and the goal map node, a first real-time path between the start point and a first stop point connecting the adjacent submaps between the start point and the goal point, and a second real-time path between the goal point and a last stop point connecting the adjacent submaps between the goal point and the start point, in response to the start map node and the goal map node not corresponding to the same submap;
move the mobile machine according to the path;
determine whether the mobile machine has arrived the goal point or not; and
return to determining, based on the current position of the mobile machine, the start point in the path between the start point and the goal point, in response to the robot having not arrived the goal point;
wherein obtaining the path between the start point and the goal point includes:
planning, using a graph search algorithm, the node path between the start map node and the goal map node; and
wherein obtaining the path between the start point and the goal point further includes:
planning, based on a pre-planned path, the node path in each of the submaps except the submap corresponding to the start point and the submap corresponding to the goal point.

18. The mobile machine of claim 17, wherein the real-time path is planned using the real-time path planning method.

19. The mobile machine of claim 17, wherein obtaining the path between the start point and the goal point further includes:
planning, using the real-time path planning method, the first real-time path between the start point and the first stop point;
planning, using the real-time path planning method, the second real-time path between the goal point and the last stop point; and
obtaining the path between the start point and the goal point by merging the node path, the first real-time path, and the second real-time path.

20. The mobile machine of claim 17, wherein the stop point corresponds to one of an entrance, a corridor, an elevator, and a nurse station.

* * * * *